METHOD FOR CONTROLLED DOPING BY GAS OF FOREIGN SUBSTANCE INTO SEMICONDUCTOR MATERIALS
Filed Jan. 5, 1967
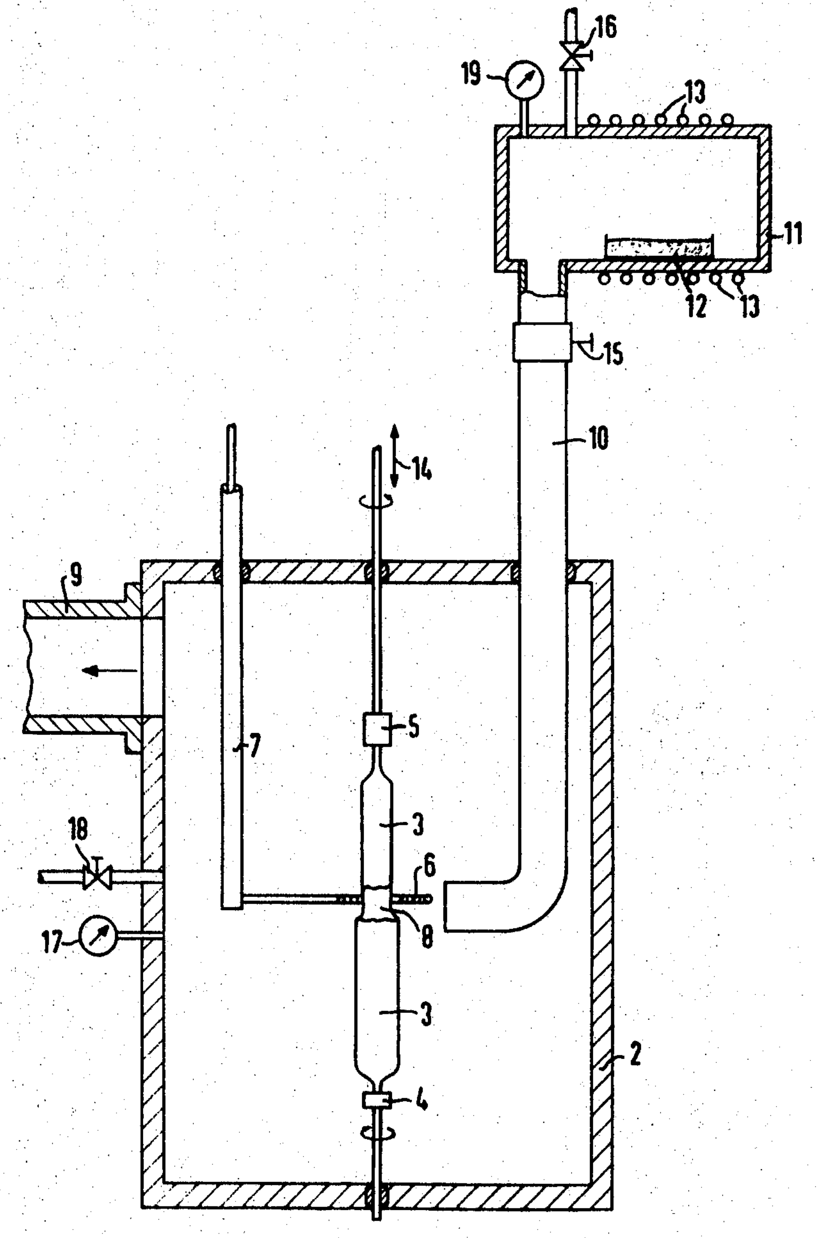

3,558,376

METHOD FOR CONTROLLED DOPING BY GAS OF FOREIGN SUBSTANCE INTO SEMICONDUCTOR MATERIALS

Otto Schmidt and Klaus Wartenberg, Erlangen, and Konrad Reuschel, Pretzfeld, Germany, assignors to Siemens Aktiengesellschaft, a corporation of Germany Filed Jan. 5, 1967, Ser. No. 607,413
Claims priority, application Germany, Jan. 7, 1966, S 101,329
Int. Cl. H01l 7/36, 7/44
U.S. Cl. 148—189 8 Claims

ABSTRACT OF THE DISCLOSURE

Controlled process for introducing foreign substances, e.g. dopants and recombination centers, into a molten semiconductor body by directing foreign substance in gaseous form in the immediate vicinity of the melt.

Semiconductor material is usually obtained through precipitation from the gaseous phase, by means of thermal and/or pyrolytic dissociation of a gaseous compound of the semiconductor material. Silicon, for example, may be precipitated from a silicon halide on heated rod-shaped carrier bodies, also comprising silicon. The precipitated semiconductor material is usually polycrystalline. Doping substances may be added to the gaseous compound of the semiconductor material, so that the semiconductor material obtained is doped to a specific conductance type. Generally, enough dopant is added that its concentration, in the precipitated semiconductor material, is larger than desired in the final semiconductor product, i.e. in the monocrystal to be used for further fabrication, such as a wafer for conversion into a diode, transistor or thyristor. The precipitated semiconductor material is usually further processed following a process wherein a crystal seed is dipped into molten semiconductor material and a semiconductor rod is pulled therefrom. The melt may be contained, for example, in a crucible. Another conventional method is crucible-free zone melting, whereby a rod-shaped body of the material to be processed is usually held at both ends in a vertical direction.

In crucible-free zone melting, both holders of the rod ends are attached to vertical shafts which may be constantly turned about their respective axes and, if the rod cross section is to be altered during the pulling process, they may be displaced vertically to or fro. A heating device produces a molten zone over a limited length of the rod. By a relative motion between the heating device and the rod-shaped body the melting zone is passed lengthwise through the rod. Impurities contained in the rod will evaporate out of the melting zone or be dissolved therein. As a rule, the zone melting is carried out in an evacuated chamber or in a chamber filled with protective gas. In most cases, therefore, the zone melting serves to purify the semiconductor material. Usually the slower the melting zone is passed through the rod, the greater the purifying effect of a zone-melting passage. Zone melting further converts polycrystalline rods into monocrystalline rods with the aid of a crystal seed, fused to one end of the rod.

The crucible-free zone melting which was found to be particularly favorable for purifying silicon rods may be repeated several, for example two or three, times per semiconductor rod. During each passage, the doping concentration decreases at least 25%. Thus the doping concentration in the original material must be larger by at least 1.2 times the desired concentration in the end product. However, it should not be more than three times, so that a uniform doping concentration could be obtained across the rod length. After the last pass, the desired doping concentration should be obtained in a monocrystal which is as perfect as possible. Following the precipitation from the gaseous phase and/or following one of the first zone-melting passes, the specific resistance of the semiconductor material is measured. The number of further passes and the travel speeds therefor, for obtaining a monocrystal with a prescribed doping concentration, are determined therefrom. An important disadvantage of this method is that the last passage is very critical for obtaining not only the exact doping concentration but also the most perfect (faultless) monocrystal structure. A fault or dislocation incurred during the last pass cannot be corrected by an ensuing pass, as the doping concentration would drop below the prescribed value. Furthermore, a subsequent increase of doping concentration is no longer possible. The semiconductor rod would thus be useless for its intended purpose. A further disadvantage is that during even the precipitation from the gaseous phase, the semiconductor material should be pre-doped, corresponding to the desired doping concentration of the monocrystal intended for further processing. The production of the semiconductor material is therefore hindered by a plurality of various dopants, from the very start.

It was, therefore, suggested that the zone melting be carried out in a chamber filled with protective gas to which doping material has been added. Thus, dopant is inserted into the semiconductor material. One disadvantage of this method particularly consists in the fact that the protective gas is of insufficient purity required for the production of highly pure semiconductor material, thus reducing the lifetime of the charge carriers and lowering the specific resistance. Another disadvantage is that one is limited in the manner of heating the semiconductor material, since discharges may occur, at pressures over $10^{-4}$ torr, between the turns of induction heating coils.

The object of the invention is a method to produce monocrystalline semiconductor material which method does not possess either one of the two aforedescribed disadvantages. The invention relates to a method for controlled insertion of doping substances into semiconductor crystals during a crystallizing process from molten semiconductor material. According to our invention, the dopant substance as a gas is supplied to the immediate portion of the molten semiconductor material within a vacuum chamber.

The drawing shows a schematic illustration of a device for carrying out the method. By means of the drawing we will explain in greater detail our invention.

In a zone-melting chamber 2, which is connected via a tube 9 to a diffusion pump, lies a not yet doped rod 3 of crystalline material which is held at its ends by holders 4 and 5, of which at least one may be rotated around its vertical axis. If, as shown in the drawing, the cross section of the rod is to be changed during the zone-melting process, then the holders 4 and 5 are relatively movable in a vertical direction. This movement is indicated by the double arrow 14. A heating device, for example an induction coil 6 fed by a high-frequency current, is affixed to a carrier 7 and passed by a cooling liquid, produces a melting zone 8. The foreign doping material gas is led to the melt through a tube 10 which ends in the chamber 2. Said gas may be taken in a gaseous condition together with a carrier gas, from a storage vessel, and be passed to the recipient through the tube 10, by devices which control the flow rate. The carrier gas may be withdrawn from a special vessel. In the illustrated embodiment, the dopant supply is contained in a boat 12, in a liquid or solid condition. This boat 12 is located in a special storage vessel 11, arranged outside the vacuum chamber. The pressure chamber 2 should be lower than the vapor pressure of the dopant or foreign gas. The vapor pressure is determined by the temperature in vessel 11.

The dopant vaporizes, thus flowing or diffusing in sufficient amounts into chamber 2 through tube 10, in which valve 15 has been installed for the control of the flow rate.

The temperature in the vessel 11 is adjustable in order to control the supply of the foreign substance gas, for example said temperature may be determined by the temperature and the flow rate of a liquid, preferably water or oil, which flows through tube turns 13. Electric heating is preferable for obtaining high temperatures. The pressure in vessel 11, which is higher than in chamber 2, preferably by a factor of 5, is measured by a manometer 19 and the pressure in chamber 2 is measured by a manometer 17.

Although the pressure in chamber 2 is lower, for example, than $10^{-4}$ torr, i.e. so low that its measurements are smaller than the free path lengths, we direct the outlet of the tube 10 toward the melting zone 8 and possibly shape the outlet of the tube to a nozzle, for a better alignment of the gas current. The foreign substance is at least partly inserted into the melting zone 8. The rod portion which crystallizes again thereafter, has a concentration of inserted foreign or dopant substances, which essentially depends on three parameters: the vapor pressure, i.e. the temperature in the storage vessel 11, the opening of the valve 15 and the pressure in the chamber 2. A constant doping concentration may be obtained by keeping constant the three parameters.

Preferably, a carrier gas is admixed to the foreign substance gas, which is being passed into the vessel 11 by an opening or a valve 16, wherein a specific pressure is thereby established. The carrier gas should be of such an amount that gas emissions which incidentally occur at the walls of the vessel 11 and the tube 10 would not result in any appreciable pressure changes. For example, the pressure in the storage vessel 11 is $10^{-3}$ to 1 torr. The desired concentration of the dopant substance in the recrystallized rod portions is very favorably achieved by balancing the pressures in chamber 2 and in the vessel 11 with the vapor pressure of the foreign substance gas, that is with the temperature and the amount of carrier gas in the chamber 2. Preferably, only the pressure in chamber 2 is changed by means of a valve 15, while the remaining parameters are kept constant. To produce a constant concentration of the foreign substance in the semiconductor mtaerial, all parameters are preferably kept constant. For example, the pressure in chamber 2 may be adjusted and kept constant by control valve 18 which is installed in a tube which exits through the wall of the chamber, in the vicinity of the pump connection, thus avoiding currents in the chamber. Any changes of pressure possibly occurring in the storage vessel 11 may be balanced by valve 15.

The temperature in the vessel 11 should be lower than that in the tube 10, so that the foreign substance gas cannot precipitate at any locality of the tube 10 and again volatilize at a later point of time, during the zone-melting process. Thus, a cause of undesirable and uncontrollable introduction of foreign substances into the semiconductor material is prevented. The vessel temperature preferred is lower than room temperature but higher than that of tap water, so that tap water could be used as the coolant and its flow rate could be regulated to obtain a constant temperature. In this case, the preferred temperature would be about 17° C. Naturally, other temperatures or ranges could also be obtained, by using somewhat more complex cooling techniques. For example, vessel 11 may be heated well above room temperature, for example to 400° C. In this instance, the temperature of the tube 10 must be even higher.

The chamber 2 and the tube 10 consist preferably of a material which does not absorb the foreign substance gas and emit it later. Chrome-nickel steel is advantageous. This choice, as well as the right temperatures, makes it possible to quickly change the concentration of the foreign substance in the semiconductor material. It is possible, for example, to again lower the concentration in a successive zone-melting pass. This constitutes an advantage of the method in the fact that during crucible-free zone melting, a semiconductor rod may be subjected to any desired number of zone-melting passes while still obtaining the desired concentration of the foreign substance.

At a temperature of the vessel 11, the foreign substance gas should have a vapor pressure sufficiently high, for example $10^{-3}$ torr, so that sufficient amounts may evaporate from the storage supply. It is preferred that, for obtaining a constant dopant concentration, the surface of the substance contained in the boat 12 be constant. The evaporating surface should remain constant during one zone-melting pass, for example by using a boat with vertical inner walls.

The foreign substance may be a dopant which causes a specific conductance type in the semiconductor material, but may also be a material which forms recombination centers or may consist of a mixture of the two. The foreign substance which is to be inserted into the semiconductor material may be used as an elemental gas or a gaseous compound. For example for doping phosphorus into silicon, elemental phosphorus may be used in spite of its high vapor pressure as long as sufficient amounts are supplied to the melt. For example phosphorus may vaporize at a temperature of 25° C. in the vessel 11, corresponding to a vapor pressure of $5\times10^{-2}$. Nitrogen with a partial pressure of $2\times10^{-1}$ torr is added as a carrier gas. The pressure in chamber 2 should amount to $10^{-5}$ torr. Under these conditions, one obtains a specific resistance of the recrystallized silicon of 5.2 ohm·cm., corresponding to a doping concentration of $2.2\times10^{-8}$ g. phosphorus/g. silicon.

Trimer phosphorus nitrilochloride $(PNCl_2)_3$ was also found to be a favorable compound for phosphorus doping. It is resistant to air and moisture so that air may be used as a carrier gas. Furthermore, it is easy to purify, for example by recrystallization of benzene, and also has a preferred vapor pressure of $5\times10^{-3}$ torr, at 20° C. Another advantage is that it does not adhere to the wall of the tube 10, if the latter is of chrome-nickel steel or aluminum. With this compound and at a pressure of, for example, $9\times10^{-5}$ torr, in the zone-melting chamber and a pressure of $4\times10^{-2}$ torr in the storage vessel, an air pressure of $3\times10^{-4}$ torr 1/sec. and a temperature of 17° C., a phosphorus concentration of $10^{-8}$ g./g. silicon was obtained in the silicon. This corresponds to a specific resistance of 11 ohm·cm.

As an added example of phosphorus doping of a silicon rod with phosphorus nitrilochloride, are the following conditions: pressure in the zone-melting chamber $6\times10^{-5}$ torr, pressure in the storage vessel 11 $1.8\times10^{-2}$ torr, airing $5\times10^{-5}$ torr 1/sec. and temperature in the storage vessel 17° C. A specific resistance of 35 ohm·cm. was obtained.

For inserting recombination centers, the molten silicon may be supplied with gold in the form of a gaseous gold trichloride ($AuCl_3$) which, at a storage vessel temperature of 145° C., has a vapor pressure of $1.2\times10^{-3}$ torr and chlorine, with a partial pressure of $3\times10^{-2}$ torr, may be added as a carrier gas. A concentration of $6\times10^{-11}$ g. was obtained at these conditions. In all examples, the pulling speed is 3 mm. per minute with a rod diameter of 19 mm. For doping with boron, boron trichloride ($BCl_3$) may be added to the melt $BCl_3$ may be taken in a gaseous condition from a storage vessel and mixed with hydrogen as a carrier gas.

The gaseous compounds of the foreign substance are dissociated at the melting zone, the foreign substance is partly inserted into the silicon and the decomposition products are withdrawn by the diffusion pump.

The method can also be applied for other known embodiments of crucible-free zone melting, which are characterized by the fact that at least one of the rod portions separated by the melting zone 8, has a larger diameter than the width of the heating device or that axes of the two rod portions are laterally displaced toward each other or that they are moved back and forth toward each other, during the process.

When the heating device is movable in a vertical direction, so must be the outlet of the tube 10. To avoid movement of the storage vessel 11 with the manometer 14, tube 10 may telescope and may simultaneously serve as a carrier for the heating device.

The method may also be applied to crystal pulling from a crucible. The foreign substance gas is then supplied to the melt, near the phase boundary liquid/solid of the growing semiconductor crystal.

Obviously many modifications and variations of the present invention are possible in the light of the above teachings. It is therefore to be understood that within the scope of the appended claims, the invention may be practiced otherwise than as specifically described.

We claim:

1. The method of controlled insertion of doping substances into semiconductor crystals during crucible free zone recrystallization from molten semiconductor material, which comprises directing doping substance gas, the supply of which is controlled by adjusting the temperature of a solid or liquid storage supply, to the immediate vicinity of the liquid/solid phase boundary of the melt of the molten semiconductor material, within a vacuum chamber under constant evacuation of less than about $10^{-4}$ torr.

2. The method of controlled insertion of doping substances into semiconductor crystals during crucible free zone recrystallization from molten semiconductor material, which comprises directing doping substance gas evaporated in a special storage vessel outside of the vacuum chamber, to the immediate vicinity of the liquid/solid phase boundary of the melt of the molten semiconductor material, within a vacuum chamber under constant evacuation of less than about $10^{-4}$ torr.

3. The method of claim 2, wherein the pressure in the storage vessel is at least 5 times the pressure in the vacuum chamber.

4. The method of claim 3, wherein a pressure of $10^{-3}$ to 1 torr is within the storage vessel.

5. The method of claim 2, wherein the supply of the doping substance gas is controlled by regulating the rate of flow.

6. The method of claim 2, wherein the pressure in the vacuum chamber and the pressure and temperature in the storage vessel are kept constant.

7. The method of controlled insertion of doping substances into semiconductor crystals during crucible free zone recrystallization from molten semiconductor material, which comprises directing gaseous boron trichloride, with hydrogen as a carrier gas, supplied as a dopant from a storage vessel to the immediate vicinity of the liquid/solid phase boundary of the melt of the molten semiconductor material, within a vacuum chamber under constant evacuation of less than about $10^{-4}$ torr.

8. The method of controlled insertion of doping substances into semiconductor crystals during crucible free zone recrystallization from molten semiconductor material, which comprises directing trimer, phosphornitrilochloride, vaporized in the storage vessel, supplied as a dopant to the immediate vicinity of the liquid/solid phase boundary of the melt of the molten semiconductor material, within a vacuum chamber under constant evacuation of less than about $10^{-4}$ torr.

References Cited

UNITED STATES PATENTS

| | | | |
|---|---|---|---|
| 3,141,848 | 7/1964 | Enk | 148—171 |
| 2,841,860 | 7/1958 | Koury | 148—189X |
| 2,897,329 | 7/1959 | Matare | 148—1.6X |
| 3,065,062 | 11/1962 | Enk | 148—1.6X |
| 3,177,100 | 4/1965 | Mayer | 148—1.6X |
| 3,306,713 | 2/1967 | Barkemeyer | 148—1.6X |
| 3,323,954 | 6/1967 | Goorissen | 148—1.6X |
| 3,360,405 | 12/1967 | Keller | 148—1.6 |

HYLAND BIZOT, Primary Examiner

U.S. Cl. X.R.

148—174